R. O. TRUEB.
IMPLEMENT FOR THREADING EMBROIDERY BEADS.
APPLICATION FILED JUNE 6, 1919.
1,335,805. Patented Apr. 6, 1920.
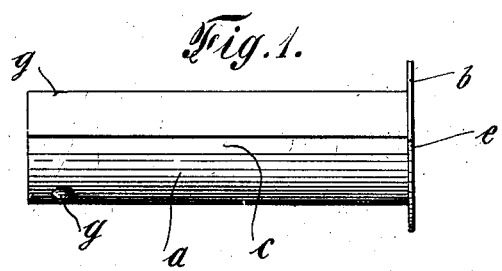
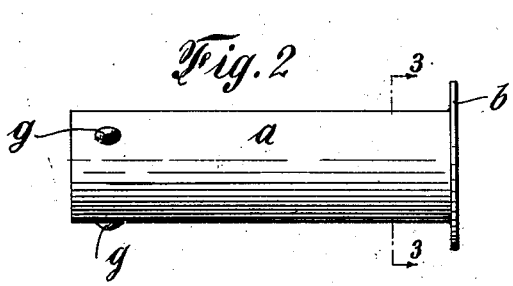
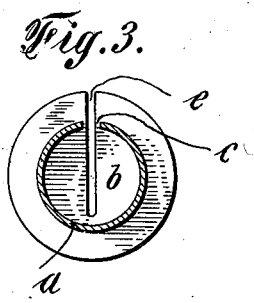
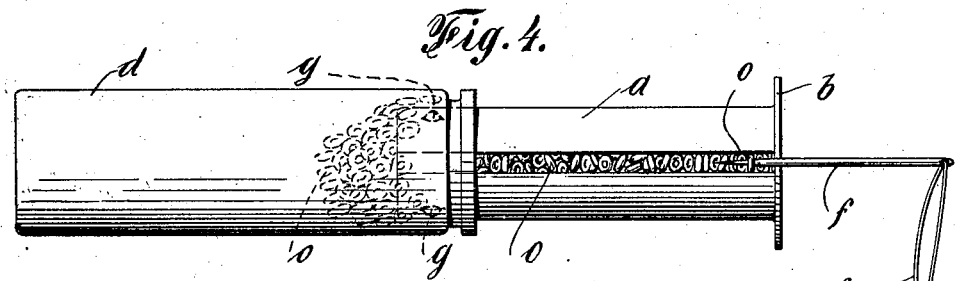
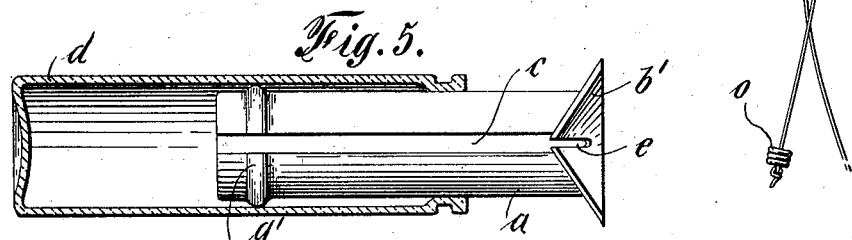
Witnesses: Rudolph O Trueb, Inventor
By Henry Schreiter his Attorney

UNITED STATES PATENT OFFICE.

RUDOLPH O. TRUEB, OF MURRAY HILL PARK, NEW JERSEY.

IMPLEMENT FOR THREADING EMBROIDERY-BEADS.

1,335,805.  Specification of Letters Patent.  Patented Apr. 6, 1920.

Application filed June 6, 1919. Serial No. 302,293.

*To all whom it may concern:*

Be it known that I, RUDOLPH O. TRUEB, a citizen of the United States, and a resident of Murray Hill Park, county of Union, and State of New Jersey, have invented certain new and useful Improvements in Implements for Threading Embroidery-Beads, of which the following is a full, clear, and exact specification, reference being had to the accompanying drawings, wherein—

Figure 1 is an elevation of the implement constructed according to my invention;

Fig. 2 a side view thereof;

Fig. 3 a sectional view on line 3—3, indicated in Fig. 2 looking in the direction of the arrow;

Fig. 4 is an elevation showing the implement inserted in the neck of a glass bottle, of the kind quite commonly used as a bead container, in position for threading the beads;

Fig. 5 is a view, similar to Fig. 1, showing a modified form of the threading implement.

My invention relates to utensils for manufacture of bead embroideries. Embroidery beads are quite extensively used for embroidering, being sewn onto a fabric. They are sold generally packed in bottles closed by a stopper. When the beads are to be used, the beads are usually emptied upon a dish, from where the operator picks them up by her needle. The unused beads are then again returned to the container. In the course of these operations much time and considerable proportion of the beads are lost.

The object of my invention is to avoid this loss of time, and of the beads, and with this object in view my invention consists in devising the herein shown and described implement, adapted to be used in connection with a container for embroidery beads to enable the beads to be strung upon the thread, whereby the same is to be affixed to the fabric, without requiring a supply of beads to be removed from the container, and, of course, also the trouble of returning the beads, remaining after the work is done, to the container, and the loss of the beads by spilling them in the operation, are avoided.

The implement shown in the accompanying drawing, is also designed to be used as a stopper for closing the opening of a bead container, usually formed in the shape of a bottle, besides being so designed, that when partly drawn out, it permits the beads to be picked up therefrom by the operator's needle.

The implement, as shown in the drawings, is composed of the tubular part $a$ and of the disk $b$, affixed on one end thereof. The other end of the tubular part $a$ is open. Both, the tube $a$ and the disk $b$, are slotted as shown. The slot $c$ in the tubular part $a$ is sufficiently wide to pass beads of the size as may be packed in the container $d$ therethrough, but the slot $e$ in the disk $b$ is only wide enough to admit a needle. The size of the tubular part $a$ corresponds to the opening of the bead container (to fit into the neck of the bottle $d$) and is made of a fairly resilient material. Near its open end the protuberances $g$, or an annular enlargement of its circumference (see $g'$ in Fig. 5) are made, which necessitate compressing its open end to pass it through the neck of the container $d$. The protuberances $g$, or the annular enlargement like $g'$ shown in Fig. 5, then prevent the implement from being pulled out entirely.

When the implement is partly drawn out, as, for instance, is shown in Fig. 4, the beads $o$ filled in the container $d$ may be shifted into the tubular part $a$, when the same is turned so the slot $e$ runs upward. Then the beads may be removed by passing a needle through the slot $e$ in the disk $b$, and then by moving the needle upward; at each stroke some of the beads are impaled on the needle $f$ and are lifted out, through the slot $c$, which, as explained, is wide enough to pass them. Only the beads impaled on the needle are thus removed from the container $d$, and these, or as many of them as wanted, may be strung on the thread $h$, threaded through the eye of the needle $f$. In this way the threading of the beads is effected conveniently, rapidly, and without any loss. Broadly considered, the container $d$ is a member for covering the slot $c$ to prevent beads from falling out during the manipulation of the implement. A person using the device will likely uncover as much of the slot $c$ as required, the rest of the slot remaining covered by the member $d$.

The modified construction of the threading implement, shown in Fig. 5, differs from that shown in Fig. 1, only in that the disk $b'$ is concaved, or funnel-shaped. The purpose of this modification is to facilitate the finding of the slot $e$ by the point of the needle, held in the hand of the operator, without looking for it.

The threading implement serves also as a stopper as long as it remains fully pushed in, into the container $d$. While the implement is in that position, the beads will be kept confined in the container, irrespective of its position, the slot $e$ in the disk $b$ being narrower than the size of the beads packed in the container $d$, as before explained.

I claim as my invention:

1. An implement for threading beads, comprising a tube fitting into the opening of the container and having a slot sufficiently wide to permit the passage of the beads therethrough, a cover at the outer end of said tube, said cover being provided with a slot wide enough to admit a needle and narrow enough to prevent the passage of beads therethrough, the slots in said tube and said cover being in alinement with each other, and a member adjustably fitted over said tube to cover and uncover said first mentioned slot.

2. An implement for threading beads, comprising a bead container and a tube adapted to fit slidably into said container, said tube being provided with two communicating slots, one of said slots being wide enough to permit the passage of beads therethrough, the other slot being wide enough to admit a needle and narrow enough to prevent the passage of beads therethrough.

3. An implement for threading beads, comprising a bead container and a tube adapted to fit slidably into said container, said tube being provided with two communicating slots, one of said slots being wide enough to permit the passage of beads therethrough, the other slot being wide enough to admit a needle and narrow enough to prevent the passage of beads therethrough, said tube being of resilient material and provided with means which engage the inner wall of the container to prevent accidental withdrawal of the tube from the container.

4. An implement for threading beads, comprising a tube fitting into the opening of the container and having a slot sufficiently wide to permit the passage of the beads therethrough, a cover at the outer end of said tube, said cover having a recessed or concave portion provided with a slot in alinement with the slot in said tube, the slot in said cover being wide enough to admit a needle and narrow enough to prevent the passage of beads therethrough, and a member adjustably fitted over said tube to cover and uncover said first mentioned slot.

5. As a new article of manufacture for use in threading beads, a tube adapted to contain beads and provided with a longitudinal slot sufficiently wide to permit the passage of beads therethrough, one end of said tube being closed and provided with a slot wide enough to admit a needle and narrow enough to prevent the passage of beads therethrough.

6. As a new article of manufacture for use in threading beads, a tube adapted to contain beads and provided with a longitudinal slot sufficiently wide to permit the passage of beads therethrough, a cover at one end of said tube and provided with a recessed or concave portion having a slot in alinement with the slot in said tube, the slot in said cover being wide enough to admit a needle and narrow enough to prevent the passage of beads therethrough.

7. As a new article of manufacture for use in threading beads, a tube of resilient material open at one end and closed at the other, said tube being provided with a longitudinal slot sufficiently wide to permit the passage of beads therethrough, protuberances near the open slotted end of said tube, said open slotted end of the tube being compressible to permit the passage of said protuberances through the opening of a bottle or like container for beads, the closed end of said tube being provided with a cover having a substantially radial slot communicating with the slot of the tube, the slot in said cover being wide enough to admit a needle and narrow enough to prevent the passage of beads therethrough.

8. An implement for threading beads comprising a bead container and a tube slidably fitting into said bead container, said tube having a longitudinal slot sufficiently wide to permit the passage of beads therethrough, a cover at the outer end of said tube and provided with a slot wide enough to admit a needle and narrow enough to prevent the passage of beads therethrough, said two slots communicating with each other, the cover on said tube forming a closure for said container when the tube is pushed in.

9. An implement for threading beads, comprising a bead container and a tube slidable fitting into said bead container, said tube having a longitudinal slot sufficiently wide to permit the passage of beads therethrough, a cover at the outer end of said tube and provided with a slot wide enough to admit a needle and narrow enough to prevent the passage of beads therethrough, said two slots communicating with each other, the cover on said tube forming a closure for said container when the tube is pushed in, and coöperating means on said container and said tube to prevent accidental withdrawal of the tube from the container.

RUDOLPH O. TRUEB.

Witnesses:
CHARLES S. SKINNER,
LOUISE KELLER.